(12) United States Patent
Tournier

(10) Patent No.: US 8,636,427 B2
(45) Date of Patent: Jan. 28, 2014

(54) OPTICAL COMMUNICATION BUS NETWORK FOR AVIONIC EQUIPMENT

(75) Inventor: Gilles Tournier, Leguevin (FR)

(73) Assignee: Airbus Operations SAS (FR)

( * ) Notice: Subject to any disclaimer, the term of this patent is extended or adjusted under 35 U.S.C. 154(b) by 1069 days.

(21) Appl. No.: 12/065,038

(22) PCT Filed: Aug. 31, 2006

(86) PCT No.: PCT/FR2006/050825
§ 371 (c)(1),
(2), (4) Date: Feb. 27, 2008

(87) PCT Pub. No.: WO2007/026102
PCT Pub. Date: Mar. 8, 2007

(65) Prior Publication Data
US 2012/0141066 A1 Jun. 7, 2012

(30) Foreign Application Priority Data
Aug. 31, 2005 (FR) ..................................... 05 52634

(51) Int. Cl.
*G02B 6/36* (2006.01)
(52) U.S. Cl.
USPC ................... 385/92; 385/88; 385/89; 385/94
(58) Field of Classification Search
USPC ........................................ 385/88, 89, 92, 94
See application file for complete search history.

(56) References Cited

U.S. PATENT DOCUMENTS

| | | | |
|---|---|---|---|
| 5,031,188 A | 7/1991 | Koch et al. | |
| 5,140,451 A | 8/1992 | Talat et al. | |
| 5,615,292 A * | 3/1997 | Beckwith | 385/89 |
| 6,502,997 B1 * | 1/2003 | Lee et al. | 385/88 |
| 6,553,166 B1 | 4/2003 | Caldwell | |
| 7,359,592 B2 * | 4/2008 | Truong | 385/24 |
| 2003/0161583 A1 * | 8/2003 | Kuhara | 385/49 |
| 2006/0199407 A1 * | 9/2006 | Demaret et al. | 439/95 |

FOREIGN PATENT DOCUMENTS

WO 03/073139 A 9/2003

* cited by examiner

*Primary Examiner* — Ryan Lepisto
(74) *Attorney, Agent, or Firm* — Lerner, David, Littenberg, Krumholz & Mentlik, LLP

(57) ABSTRACT

An avionic system for an aircraft including at least two pieces of equipment which can exchange information by means of at least one electrical bus for simultaneous bidirectional communication, in which the information can be exchanged between pieces of equipment via an optical bus that can be connected to the electrical interfaces of the equipment. The optical bus of the avionic system includes at least one optical cable having at least one optical fiber and, at each end, a connector having means for converting electrical signals into optical signals and means for converting optical signals into electrical signals. The optical bus is connected to the electrical outlets of existing equipment.

12 Claims, 4 Drawing Sheets

OPTICAL COMMUNICATION BUS NETWORK FOR AVIONIC EQUIPMENT

CROSS-REFERENCE TO RELATED APPLICATIONS

This application is the National Stage of International Application No. PCT/FR2006/050825, International Filing Date, Aug. 31, 2006, which designated the United States of America, and which international application was published under PCT Article 21 (2) as WO Publication No. WO 2007/026102 A1 and which claims priority from French Application No. 05 52634, filed Aug. 31, 2005.

BACKGROUND

1. Field

The disclosed embodiments relate to means for connecting pieces of avionics equipment on board an aircraft by means of an optical communication bus network when these pieces of equipment have been designed for communication via an electrical bus network, without it being necessary to modify said pieces of avionics equipment.

2. Brief Description

Current civil airplanes depend greatly on digital technologies. Various pieces of equipment having an electronic communication interface, such as computers or other pieces of equipment provided with microprocessors, microcontrollers or digital interfaces, fulfill drive, control and monitoring functions on board the aircraft and exchange information over digital buses.

Buses employed most are electrical buses using cables with a core made of a conducting metal, generally copper or aluminum. The digital data is then transmitted in the form of variations in electrical voltage. The technology of electrical buses, in particular serial buses in which coded information is transmitted in succession on the same physical medium, is justified, in particular by the reliability of the connection means on board aircraft that are subjected to severe operational environments. However, these electrical buses have the drawback of being relatively heavy and sensitive to electromagnetic interference.

The requirement, especially for operational interchangeability reasons, for high stability in the definition of the equipment employed on board airplanes, in particular at their physical and functional interfaces, has lead aircraft manufacturers to normalize the mechanical and electrical interfaces of this equipment.

The aeronautics world is for example very familiar with the ARINC 429 standard, which defines in detail the interfaces and protocols for communication between pieces of equipment on board airplanes by means of one-way buses that meet this standard.

More recently, simplification of the physical buses has been made possible by increasing the data rates that these buses are capable at the present time of supporting with the reliability conditions necessary for aeronautical applications. Thus, several one-way buses operating at relatively modest data rates used in systems in accordance with the ARINC 429 standard may be replaced by a two-way bus with a high data rate, for example one hundred megabytes per second. These high data rate two-way buses are associated with new standards and, of course, with new communication interfaces for avionics equipment.

These new interfaces are at the present time still associated with electrical communication buses for the operational reliability reasons mentioned above.

FIG. 1 shows an architecture for a number of pieces of on-board electronic equipment connected via a high data rate electrical bus.

In this example, computers 1a, 1b, 1c are connected, via electrical communication buses 4a, 4b, 4c respectively, to a switch 2 which is a piece of equipment capable of switching electrical signals from one bus to another according to address signals arriving on the bus itself. Other pieces of equipment 3a, 3b, for example sensors or actuators, are connected directly to the computers 1a, 1b, respectively, by means of electrical communication buses 5a, 5b respectively.

Simultaneous two-way electrical communication buses, called full-duplex buses, generally consist of two pairs of electrical conductors, or four-channel cable, each pair being dedicated to one communication direction. In general, each pair is twisted, and the cable thus formed has a shield intended to protect the cable from electromagnetic interference coming from the outside and also to protect the external environment from the electromagnetic radiation that might be transmitted by the cable. These cables frequently have a mass per unit length of around 40 to 50 g/m. The cable is equipped at each of its ends with connectors comprising four electrical contacts, these being male or female contacts depending on the requirement, with the shielding taken up onto the metal structure of the connector. The ARINC 600 standard (see supplement 14, appendix 20 of the provisional addition of 15 Jul. 2003) describes electrical and mechanical characteristics of such a four-channel connector. In these connectors having four electrical contacts, the two contacts dedicated to transmission are generally called Tx+ and Tx− contacts, and the two contacts dedicated to reception are generally called Rx+ and Rx− contacts. The + and − signs remind users that the bus is polarized and that this polarity must be respected when mounting connectors on the electrical cable of the bus.

It is also possible to convert the information to be transmitted into optical signals that can propagate along optical fibers. Optical communication buses, which have advantages in terms of weight per unit length, data rate and electromagnetic radiation insensitivity, are still not widely used in the field of civil transport aircraft because of problems when connecting optical links and because of the current equipment technology which at the present time is predominantly designed to operate with electrical communication buses.

SUMMARY

The disclosed embodiments allow aircraft whose equipment is designed to operate with electrical communication buses to benefit from the possibility of communicating via optical communication buses and therefore to benefit from this technology in particular in terms of weight and insensitivity to electromagnetic interference, these being two particularly critical problems for aircraft, without critically reexamining the existing definition of the equipment connected to these buses, which equipment meets, and must still meet for several years, standards that correspond to electrical communication buses.

To do this, an aircraft avionics system according to the disclosed embodiments comprising two or more pieces of equipment designed to exchange information by means of one or more electrical buses for simultaneous two-way communication, at least one of the electrical buses is replaced with at least one optical bus, the end connectors of which are capable of being connected to electrical interfaces of said pieces of equipment.

In a preferred embodiment of the avionics system, the optical bus comprises at least one optical cable comprising at least one optical fiber and at each of its ends, a connector incorporating means for converting electrical signals into optical signals and means for converting optical signals into electrical signals.

The connector of the optical cable has, at its end intended to be connected to a piece of equipment, an electrical/mechanical interface identical to those of four-channel electrical buses, comprising two electrical contacts for transmitting electrical signals and two electrical contacts for receiving electrical signals.

In one embodiment of the disclosed embodiments, the electrooptic signal conversion means incorporated into the connector are supplied via at least one conducting wire that can be connected to a power supply external to the connector. The grounding of the electrooptic conversion means may be performed by a second conducting wire connected to the aircraft ground or preferably grounded via the structure of the connector casing.

In another embodiment, the electrooptic signal conversion means incorporated into the connector are supplied with a voltage applied to one of the electrical contacts, either transmission contact or reception contact, of the connector. Preferably in this case, the pieces of avionics equipment deliver, at the bus socket for the equipment, on the contact—either transmission or reception contact—adopted, the voltage needed to supply the electrooptic means, the other contacts being protected against the effects of this voltage in the case in which an electrical communication bus were to be connected and to apply said supply voltage to the contact opposite the contact serving for the supply. By taking these precautions, the avionics system will use either an electrical communication bus or an optical communication bus on a link between two pieces of equipment.

The disclosed embodiments also relate to a bus for simultaneous two-way digital data communication between pieces of avionics equipment of an aircraft comprising an optical cable incorporating at least one optical fiber, with, at a first end of the optical cable, a first connector comprising means for holding the optical cable and for positioning the optical fiber, electrooptic means for converting electrical signals into optical signals of wavelength $\lambda_1$, electrooptic means for converting optical signals of wavelength $\lambda_2$ into electrical signals, electrical contacts conforming geometrically and electrically to those for an electrical bus of the four-channel type, and with, at the second end of the optical cable, a second connector comprising means for holding the optical cable similar in their functions to those of the first connector, electrooptic means for converting electrical signals into optical signals of wavelength $\lambda_2$, electrooptic means for converting optical signals of wavelength $\lambda_1$ into electrical signals, and electrical contacts conforming geometrically and electrically to those for an electrical bus of the four-channel type but possibly differing from those of the first connector.

For implementing the embodiment in which the electrooptic conversion means of the connector are supplied via one or more contacts of the electrical connector of the optical bus, the disclosed embodiments also relate to a piece of avionics equipment comprising at least one socket for an electrical simultaneous two-way digital communication bus of the four-channel type, such that a supply voltage for the electrooptic conversion means is superposed on the digital signal on at least one of the two electrical contacts of the socket that are dedicated to transmitting signals on the electrical communication bus and also including means for a digital signal, arriving on the electrical contacts of the socket that are dedicated to reception, to be correctly received by the piece of equipment whether this signal is superposed or not with a voltage having the same characteristics as the supply voltage for the electrooptic conversion means.

Similarly, the disclosed embodiments relate to a piece of avionics equipment comprising at least one socket for an electrical simultaneous two-way digital communication bus of the four-channel type, such that a supply voltage for the electrooptic conversion means is generated on at least one of the two electrical contacts of the socket that are dedicated to receiving signals from the electrical communication bus and including means for a digital signal, transmitted on the electrical contacts of the socket that are dedicated to transmission, to be correctly transmitted by the piece of equipment and these electrical transmission contacts are or one of them is or is not under a voltage having the same characteristics as the supply voltage for the electrooptic conversion means.

BRIEF DESCRIPTION OF THE DRAWINGS

A description of preferred embodiments of the disclosed embodiments is given below with reference to the figures.

DETAILED DESCRIPTION

Figure 1:
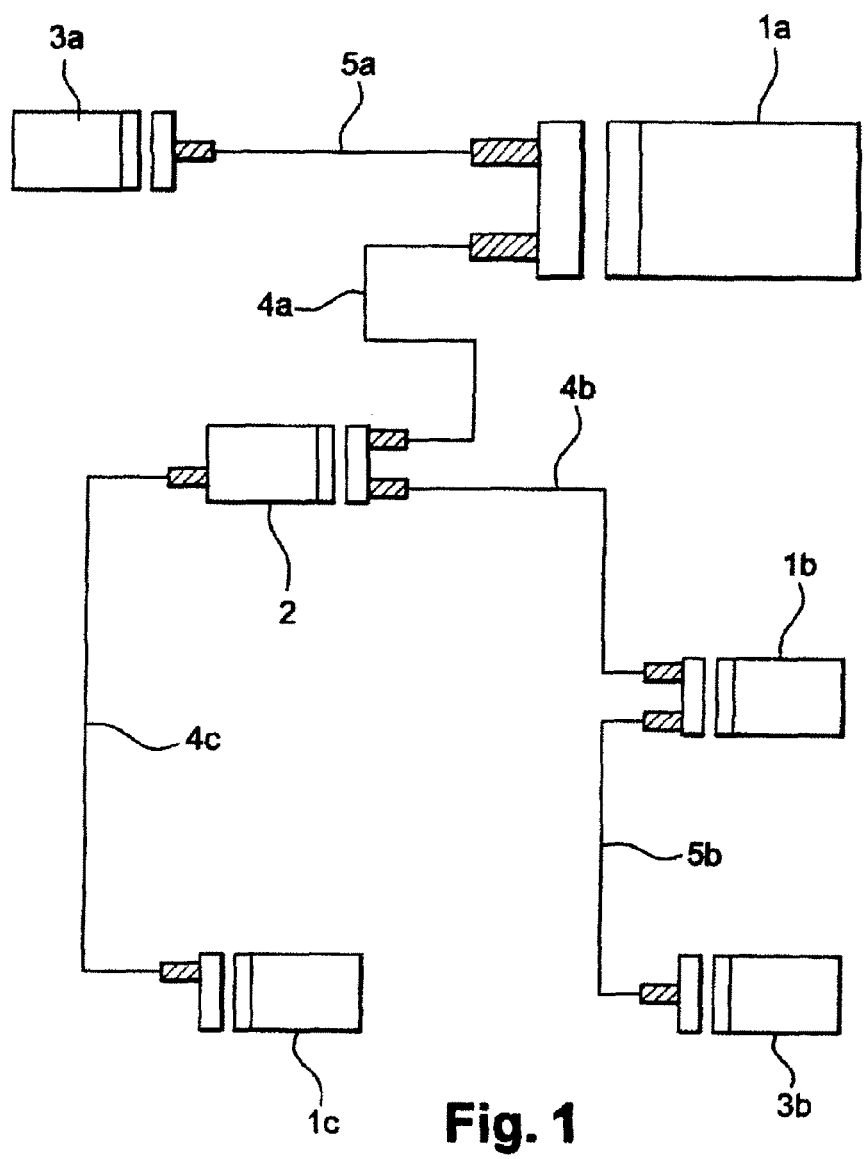
FIG. 1: prior art, already mentioned, of an electrical communication bus network.
Figure 2:
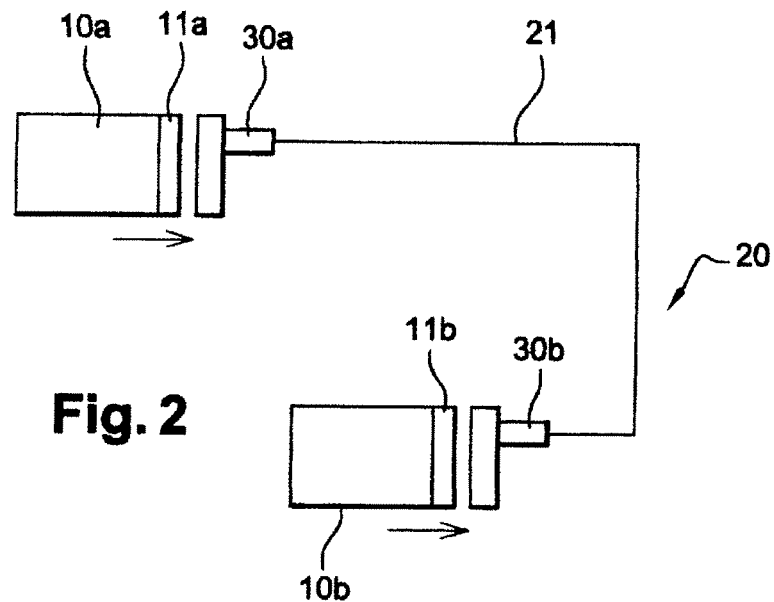
FIG. 2: an example of a communication bus network architecture according to the disclosed embodiments.
Figure 3:
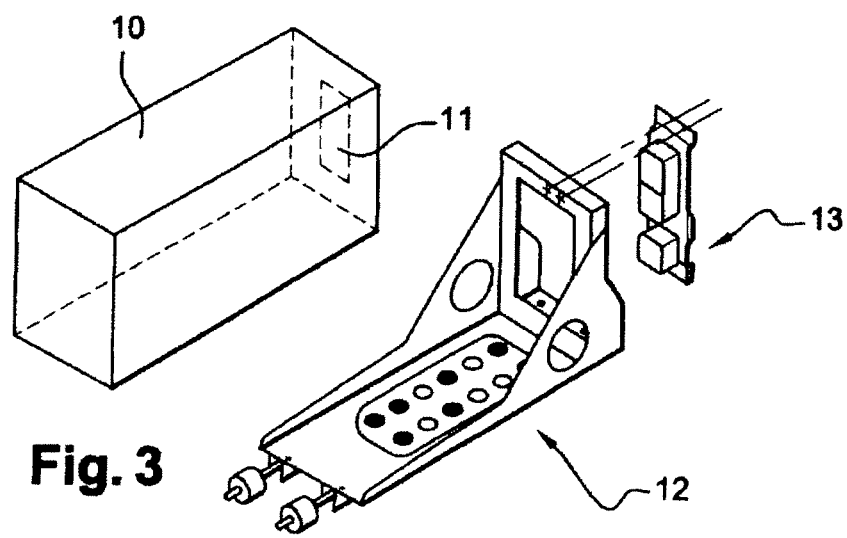
FIG. 3: details of the installation of a piece of avionics equipment and its electrical connection means; detail (a) is an end view of the connector, on the electrical contacts side.
Figure 4:
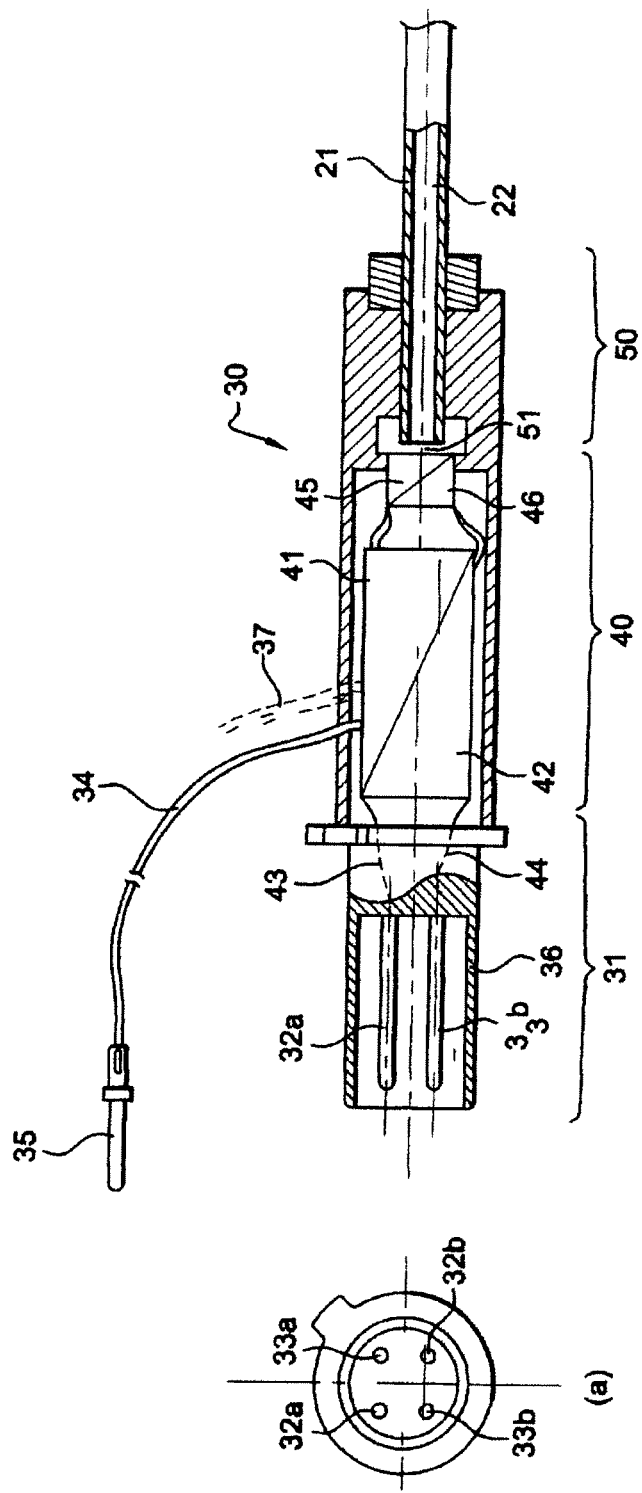
FIG. 4: details of an electrical connector (in partial cross section) for an optical bus according to the disclosed embodiments.
Figure 5:
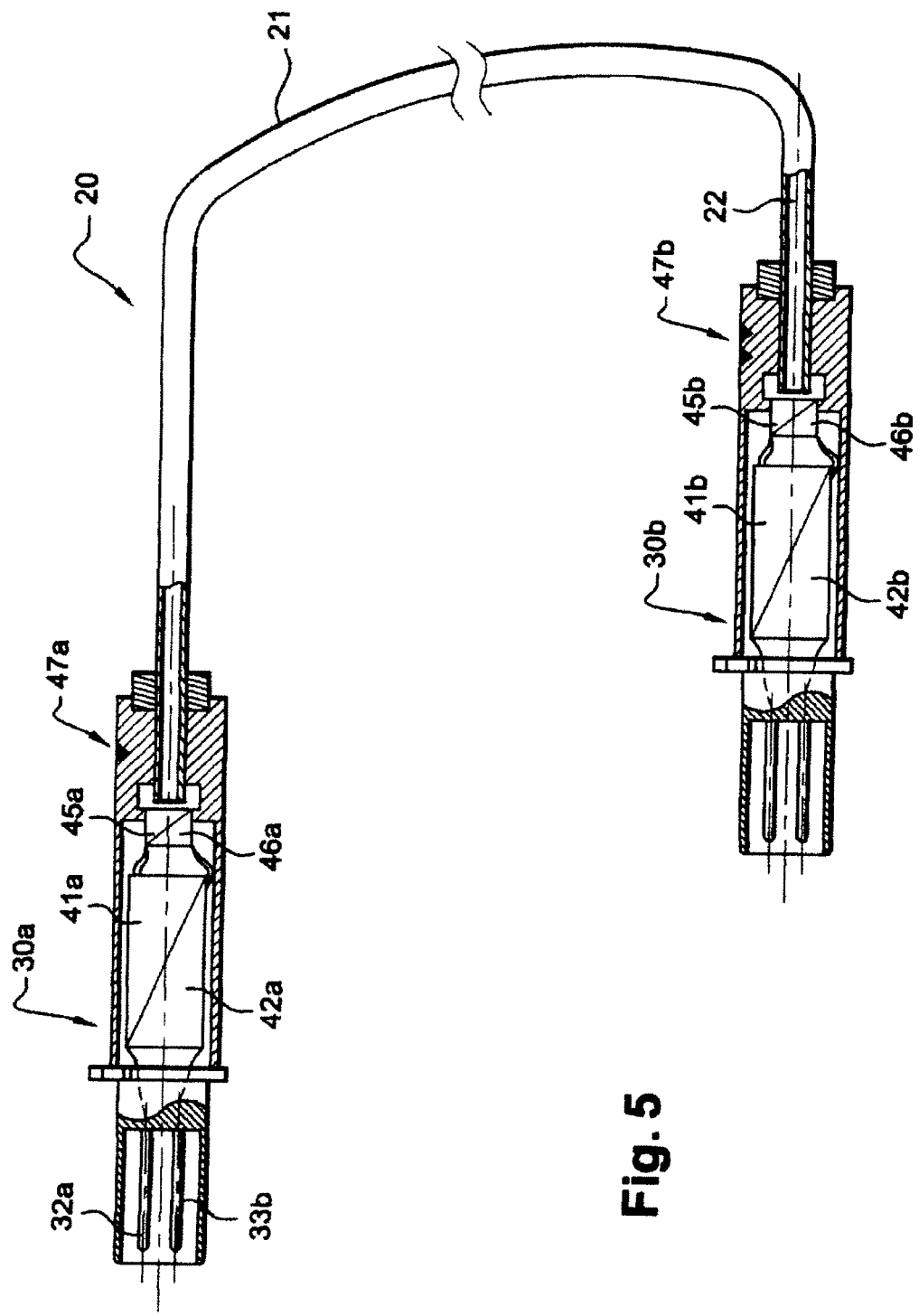
FIG. 5: an optical bus (in partial cross section) with four-channel electrical connection.

The avionics system according to the disclosed embodiments comprises a number of, at least two, pieces of equipment 10a, 10b, on board an aircraft, these exchanging information via a communication bus network using at least one optical digital bus 20.

These pieces of equipment 10a, 10b may be of any type, but are designed to transmit or receive digital information, for example computers performing relatively complex operations, for example those relating to the flying, mission control or monitoring of the aircraft and of its systems, sensors or sensor measurement concentrators, actuators and equipment specific to the communication bus network, such as electronic switches or electronic routers.

Both pieces of equipment 10a, 10b in question have at least one bus connection interface 11a, 11b comprising at least one four-channel electrical socket to be connected to at least one two-way electrical communication bus for ensuring information exchange with one or more other pieces of equipment.

In the present avionics system architecture, despite the interfaces 11a, 11b that are defined for these pieces of equipment 10a, 10b being connected via electrical communication buses, at least one link for exchanging information between the pieces of equipment 10a, 10b is produced by means of an optical communication bus 20 comprising an optical cable 21 fitted at its ends with connectors 30a, 30b, the terminations of which comprise electrical connection plugs compatible with the four-way cable electrical sockets on the pieces of equipment 10a, 10b.

The electrical connection plug of the connector 30 has two contacts 32a and 32b dedicated to transmitting information on the avionics equipment 10 and two contacts 33a, 33b dedicated to receiving information via the avionics equipment. To convert the electrical signals into optical signals in respect of the pair of contacts 32a, 32b intended to be connected to the transmitting contacts of the socket on the computer 10 and converting the optical signals into electrical signals in respect of the pair of contacts 33a, 33b intended to be connected to the reception contacts of the socket on the computer 10, each connector 30 mounted on one end of the optical communication bus 20 has electrooptic components configured so as to provide these conversions, either electrooptic components 45 for electrical-to-optical conversion or electrooptic components 46 for optical-to-electrical conversion. Such electrooptic components are already known for producing systems for data transmission by means of optical fibers. When fitted in electronic equipment, the optical fibers are connected in this case to the equipment by means of an optical connector. There are also electrooptic components that integrate the two conversion functions, namely electrical-to-optical conversion and optical-to-electrical conversion, which proves to be useful in applications having little space and when the two directions of communication are supported by one and the same optical fiber.

Functionally, the connector 30 comprises three zones:

a first end zone 31 intended to co-operate with the electronic equipment 10 by means of an electrical coupler geometrically and electrically identical to the four-channel bus connectors and complying with the required definition for the avionic equipment 10 in question;

an intermediate zone 40 comprising the electrooptic means 45 for converting the electrical signals coming from the equipment 10 into optical signals, for transmission over the optical communication bus 20, and the electrooptic means 46 for converting the optical signals to electrical signals, for reception from the optical communication bus 20 intended for the equipment 10, and also electronic circuits 41 and 42 respectively, associated with the electrooptic components 45 and 46 for ensuring their operation; and a second end zone 50, on the opposite side from the first zone 31 on the connector 30, capable of being connected to the optical cable 21, that is to say capable of providing the mechanical link between the connector 30 and the optical cable 21 and of ensuring that the optical fiber or fibers 21 emitting the optical signal are held in position.

The first end zone 31 of the connector 30 must comply with the definition of the expected electrical interfaces of the avionics equipment in question and ensure, in particular by its geometry, that it can be mounted on the receptacle 13 generally fitted at the back of the rack 12 that has to receive the avionics equipment 10 or that can be mounted directly on the interface 11 of the avionics equipment, if the latter is designed for such direct mounting.

The intermediate zone 40 of the connector 10 contains the electrooptic part of the connector 30. Preferably, the smallest possible electrooptic components compatible with the size of the existing cases of connectors for four-channel electrical cables are used, but if the constraints associated with integrating the electronic and electrooptic components so require, it may be necessary to modify the geometry of this zone 40 compared with that of a conventional four-channel connector, for example by extending it, making sure that this does not result in it being impossible to mount the connector 30 on the receptacle 13 of the rear part of the rack 12 supporting the equipment 10 or on the equipment itself.

The electrooptic converter comprises:

at least one electronic circuit 41, 42 electrical connections 43, 44 of the electrical contacts 32a, 32b, 33a, 33b of the connector at the said at least one electronic circuit 41, 42;

at least one component 45 for converting an electrical signal into an optical signal (for example a light-emitting diode, laser diode, etc.) electrically connected to the transmission components 41 of the at least one electronic circuit 41, 42; and at least one component 46 for converting an optical signal into an electrical signal (for example a phototransistor, etc.) electrically connected to the reception components 42 of the at least one electronic circuit 41, 42.

In one particular embodiment of the disclosed embodiments, electrical signal processing means, for example amplifiers or signal shaping circuits, are mounted in the connector 30, for example to improve the quality of the transmitted signal. These means may be separate from the electronic circuit 41, 42 or incorporated into it.

Since the optical communication bus 20 has to be full-duplex, the transmission and reception signals are advantageously transmitted over the same optical fiber or fibers 22 of the optical cable 21, whereas they propagate on pairs of separate electrical conductors in the case of a conventional four-channel electrical bus. To separate the optical signals being transmitted from the optical signals being received, they will preferably be transmitted using optical signals of different wavelengths, $\lambda_1$ and $\lambda_2$, for each of the directions of communication, this being obtained by means of optical-signal-transmitting components 45 and receiving components 46 matched to the chosen wavelengths and/or chosen wavelength-selective filter means (not shown in the figures) associated with the transmitting components 45 and receiving components 46. For example, with the electrooptic components and optical fibers known in the optical communications field, the signals are transmitted with a wavelength centered on 1310 nanometers in one direction along the optical fiber and with wavelengths centered on 850 nanometers in the other direction in order to obtain good transmitted signal separation in each direction.

It will be noted that if $\lambda_1$ is the wavelength corresponding to the signals transmitted at one end, for example that corresponding to the connector 30a, of the optical bus 20, that is to say the wavelength to which the optical component 45a is designed to transmit the optical signal injected into the optical fiber 22, it is at this same wavelength $\lambda_1$ that the optical component 46b receiving the optical signal at the other end of the optical bus 20, corresponding to the connector 30b in this example, must be adapted. At this same other end of the optical bus, the optical component 45b associated with the connector 30b must be designed to emit the optical signal at the wavelength $\lambda_2$, which is also the wavelength to which the optical reception component 46a associated with the connector 30a at the first end of the optical bus 20 must be adapted. Thus, for each optical bus 20 of the network, that is to say an element comprising an optical cable 21 between two connectors 30a, 30b having ends with four-channel electrical contacts, the connectors 30a and 30b located at each end of the optical bus 20 are different in so far as the transmit and receive wavelengths are reversed between the two connectors. The characteristics of the electrooptic components 45 and 46 providing the transmit and receive functions are therefore adapted so as to take this reversal into account. If the geometrical aspect of the ends 31 having the electrical connections, which however must meet the four-channel connection polarity conditions, on the connectors 30a, 30b mounted at the two ends of the optical communication bus 20, which may be identical or different depending on the destination of the bus, is not taken into consideration, the connectors 30a and 30b must be complementary because of the different optical characteristics for the two directions of communication of the transmitted signals.

In practice, to meet the requirement of having optical communication buses 20 equipped at each of their two ends with either a male connector or a female connector, it is necessary to have at least four models of connectors in order to replace the four-channel electrical communication buses with optical communication buses according to the disclosed embodiments, i.e.:

model MA: male connector transmitting signals at the wavelength $\lambda_1$ and receiving the signals at the wavelength $\lambda_2$;

model FA: female connector transmitting signals at the wavelength $\lambda_1$ and receiving the signals at the wavelength $\lambda_2$;

model MB: male connector transmitting the signals at the wavelength $\lambda_2$ and receiving the signals at the wavelength $\lambda_1$; and model FB: female connector transmitting the signals at the wavelength $\lambda_2$ and receiving the signals at the wavelength $\lambda_1$.

The optical communication buses 20 according to the disclosed embodiments will thus be produced with combinations of connectors 30a, 30b at their male/male or male/female or female/female ends, by respecting a combination of connector models of the xA-yB type in which x and y will be M or F depending on the requirements of the communication bus network to which the buses are intended.

To limit the risk of fitting connectors 30a and 30b identical in their optical operation at the ends of one and the same optical communication bus 20, for safety and for quality control purposes, the connectors 30a, 30b of the two types in regard to their optical operation are differentiated, for example by means of different shapes of part of the connector 30, the shape of which runs no risk of impeding the mounting of the connectors on the intended receptacles 13 and/or those with a color code and/or markings 47a, 47b on the body of the connectors 30a, 30b. Despite this dissymmetry in the optical operation internal to the optical communication bus 20, the bus 20 does not have a preferred direction from the functional standpoint and it also operates whether connected in one direction or the other between the two pieces of equipment 10a, 10b between which it provides data transmission, provided that the electrical interfaces are compatible and provided that no mechanical means limits the direction of fitting of the optical communication bus 20.

Another aspect of the optical communication bus 20 relates to the power supply for the components of the electronics incorporated into the connectors 30. The components currently used to convert electrical signals into optical signals, or vice versa, generally require a low-voltage DC power supply (of a few volts). It is therefore necessary to bring such a power supply to the connector 20 and to the electronic circuits incorporated into the intermmediate zone 40. This electrical power is for example supplied by means of a single supply wire 34 which is connected to a voltage source (not shown) matched to the requirement of the electronics incorporated into the connector 20. For example, the supply wire 34 is equipped at its free end with an electrical contact 35 that can be inserted into a housing in the receptacle 13 or of an equivalent receptacle, said housing corresponding to an electrical point of contact where the desired voltage is available. In general, avionic system designers provide, on the receptacles of connectors and electrical contacts, free spaces in reserve, on which contacts may be wired in order to bring the desired voltage from the electric power generators of the airplane. The electrical ground of the casing 36 of the connector 30, which, as a general rule, once the connector 30 has been connected, is connected to the electrical ground of the aircraft, then provides the current return. If the current return via the ground of the casing of the connector 30 is not desired or is not possible, a second wire 37 is provided, the end of which, on the opposite side from the connector 30, is connected to the electrical ground of the aircraft. If the voltage needed to operate the electronics incorporated into the connector 30 is one of the voltages needed to operate the electronic equipment 10 in question, this voltage is in general available on a contact of the backplane receptacle 13 of the rack 12.

In one particular embodiment of the disclosed embodiments, the pieces of avionics equipment 10a, 10b are modified so that a voltage is superposed on the signal on at least one electrical contact of the connector of the avionics equipment 10 to which the end connector 30 of the optical communication bus 20 must be connected. Advantageously, the supply voltage is applied between an electrical contact of the connector in question of the avionics equipment 10 and the electrical ground of this connector, generally connected to the electrical ground of the equipment 10. It is also possible to apply the supply voltage between two of the electrical contacts of the connector in question of the avionics equipment 10. Such a voltage, DC or quasi DC with regard to the carrier signal frequencies for the information transmitted on the communication bus, has no impact on the quality of the digital signal to be transmitted and makes it possible to supply electronic circuits 41, 42 incorporated into the end connector 30 of the optical communication bus 20, directly by the internal power supply for the avionics equipment 10. This embodiment obviates additional electrical wiring at the receptacle 13 of the rack 12 for supporting the equipment 10.

When the electrical power supply of the connector 30 by the avionics equipment 10 is provided only via one or two transmission contacts 32a, 32b of the connector 30 or else only via one or two reception contacts 33a, 33b, this choice being a priori arbitrary, decoupling means, for decoupling between the signals and the electrical supplies, are advantageously provided so that the pieces of avionics equipment operate either with optical communication buses according to the disclosed embodiments or conventional four-channel electrical communication buses that the optical communication buses replace. When the supply voltage for the connector 30a is applied to an electrical contact, for example the transmission contact 32a if this choice is made, for the piece of equipment 10a located at one end of the communication bus, this voltage ends up, when a conventional four-channel electrical communication bus connects the two pieces of equipment 10a and 10b, on a different contact of the second piece of equipment 10b—for example the reception contact 33a in the choice adopted, which contact is associated with said decoupling means that are incorporated into the pieces of avionics equipment 10 modified so as to supply the internal electronics of the connectors 30 according to the disclosed embodiments. These decoupling means separate the signal from the supply voltage so that the operation of the avionics equipment 10 is not disturbed by applying, on the electrical contact of the socket of said avionics equipment, the voltage coming from the avionics equipment connected to the other end of the electrical communication bus. Such means may for example be produced by means of capacitors which block the quasi DC component of the supply voltage and let through the signals, which are high-frequency signals.

The second end zone 50 of the connector 30 has the role of maintaining the optical cable 21 at the end of the connector 30, ensuring that the optical fiber 22 is in alignment with the optical windows 51 for transmitting and receiving the optical signals from the electrooptic components 45, 46 of the intermediate zone. This arrangement requires very great precision and the quality with which the signal propagating along the optical fiber is transmitted depends on the quality with which this arrangement is made. Among the criteria having a strong impact on the quality of the transmission, and on the time over which this quality will be maintained, are the absence of dust, grease or other elements that may reduce the transparency of the optical connection, the perpendicularity and the polishing of the end of the optical fiber, and the centering of the fiber with respect to the electrooptic components. The methods of fitting the end of an optical cable for obtaining good transmission qualities are known, including those that take into account the problems of the mechanical strength of the connection and of the sealing of the fitting. The bus according to the disclosed embodiments makes it possible to carry out these fitting operations in specialized workshops in which all the conditions for obtaining the required quality may be guaranteed with means that are very difficult, if not impossible, to implement on an industrial scale in order to obtain the same quality when the optical connection is made at the time of fitting the optical bus 20 into the aircraft.

Thus, with an avionics architecture using the communication buses 20 according to the disclosed embodiments, all the connections and the connection/disconnection operations are carried out on electrical contacts without any particular weakness. The operator of the aircraft has no need at any moment to take into consideration that an optical bus is employed and in particular has no need to provide particular conditions for the maintenance operations that the use of optical connectors imposes. The aircraft maintenance crew have no need to receive particular training or qualifications other than those acquired for the needs for maintaining existing electrical buses.

Furthermore, since the avionics equipment 10 is completely compatible with an electrical communication bus network and with an optical communication bus network according to the disclosed embodiments, there is no risk of error with regard to the model of the equipment and an airline using airplanes equipped with the two types of bus has no need to manage two families of equipment according to the type of communication bus fitted on each airplane.

When the embodiment consisting in supplying the internal electronics of the connectors 30 via a contact of the connector by means of modified electronic equipment is employed, it is possible to replace, for example during maintenance operation, an electrical communication bus with an optical communication bus according to the disclosed embodiments, or vice versa, without it being necessary to work on the wiring of the receptacle 13 of the avionics equipment 10.

The invention claimed is:

1. An aircraft avionics system comprising:
at least first and second pieces of equipment comprising a first and second bus interface, respectively, configured for exchanging information over at least one electrical bus for simultaneous two-way communication,
at least one two-way optical communication bus, configured to replace the at least one electrical communication bus and connected between the first and second bus interface of the at least first and second pieces of equipment, respectively, for exchanging information between the at least first and second pieces of equipment,
the at least one two-way optical communication bus comprising at least one optical cable having:
a first end comprising:
a first electrooptic converter for converting electrical signals from one of the first and second pieces of equipment into optical signals of a first wavelength $\lambda 1$, and a second electrooptic converter for converting optical signals of a second wavelength $\lambda 2$ into electrical signals provided to the one of the first and second pieces of equipment; and
a second end comprising:
a third electrooptic converter for converting electrical signals from other of the first and second pieces of equipment into optical signals of the second wavelength $\lambda 2$,
a fourth electrooptic converter for converting optical signals of the first wavelength $\lambda 1$ into electrical signals provided to the other of the first and second pieces of equipment.

2. The avionics system of claim 1, wherein each of the first and second interface comprises a connector comprising four channels, the four channels comprising two electrical contacts for transmitting electrical signals and two electrical contacts for receiving electrical signals.

3. The avionics system of claim 2, wherein electronic components of one or more of the electrooptic converters incorporated in a connector comprise at least one conducting wire for connection to an external power supply.

4. The avionics system of claim 2, wherein at least one of the two electrical contacts for transmitting electrical signals and the two electrical contacts for receiving electrical signals supplies power to an electro-optical converter of the first and third electrooptic converters and an opto-electrical converter of the second and fourth electrooptic converters.

5. The avionics system of claim 4, wherein at least one of the pieces of equipment includes a decoupler for decoupling the power from the electrical signals, allowing interchangeable use of the at least one electrical bus or the at least one two-way optical communication bus.

6. The avionics system of claim 2, wherein at least one of the two electrical contacts for transmitting electrical signals supplies power to an electro-optical converter of the first and third electrooptic converters and an opto-electrical converter of the second and fourth electrooptic converters.

7. The avionics system of claim 6, wherein at least one of the pieces of equipment comprises an electrical power supply for delivering power to the at least one of the two electrical contacts for transmitting signals.

8. The avionics system as claimed in claim 6, wherein at least one of the first and second pieces of equipment comprises at least one socket for the at least one electrical bus and for the at least one two way optical communication bus, wherein the power is superposed on a digital signal on the at least one of the two electrical contacts for transmitting electrical signals, the socket comprising a decoupler for decoupling the power from the digital signal.

9. The avionics system of claim 2, wherein at least one of the two electrical contacts for receiving electrical signals supplies power to an electro-optical converter of the first and third electrooptic converters and an opto-electrical converter of the second and fourth electrooptic converters.

10. The avionics system of claim 9, wherein at least one of the pieces of equipment comprises an electrical power supply for delivering power to the at least one of the two electrical contacts for receiving signals.

11. The avionics system as claimed in claim 9, wherein at least one of the first and second pieces of equipment comprises at least one socket for the at least one electrical bus and for the at least one two-way optical communication bus, wherein the power is superposed on a digital signal on the at least one of the two electrical contacts for receiving electrical signals, the socket comprising a decoupler for decoupling the power from the digital signal.

12. The avionics system of claim 1, wherein the at least one two-way optical communication bus comprises:

at the first end of the optical cable, a first connector comprising:
means for holding the optical cable fastened to the first connector in a position of alignment, and
electrical contacts conforming geometrically and electrically to four channel electrical bus contacts; and
at the second end of the optical cable, a second connector comprising:
means for holding the optical cable fastened to the second connector in a position of alignment, and
electrical contacts conforming geometrically and electrically to four channel electrical bus contacts.

* * * * *